Feb. 13, 1923.　　　　W. L. COOK.　　　　1,445,072.
TERMINAL BOX.
FILED NOV. 20, 1919.　　　3 SHEETS—SHEET 1.

Inventor:
Wallace L. Cook,
By Andrews & Lindell
attys

Feb. 13, 1923.

W. L. COOK.
TERMINAL BOX.
FILED NOV. 20, 1919.

1,445,072.

3 SHEETS—SHEET 2.

Inventor:
Wallace L. Cook,
By Andrews & Lundell
attys.

Inventor:
Wallace L. Cook,
By Andrews & Lindell
attys.

Patented Feb. 13, 1923.

UNITED STATES PATENT OFFICE.

WALLACE L. COOK, OF CHICAGO, ILLINOIS.

TERMINAL BOX.

Application filed November 20, 1919. Serial No. 339,505.

*To all whom it may concern:*

Be it known that I, WALLACE L. COOK, a citizen of the United States, residing at Chicago, in the County of Cook and State of Illinois, have invented certain new and useful Improvements in Terminal Boxes, of which the following is a specification.

This invention relates to a terminal box for electric cables, and more particularly for distributing systems, as a means for connecting cable wires. Such terminal boxes are adapted for terminating so called electric cables consisting of a plurality of electrical conductors protected by an armor or sheath, and provide means for bringing each of the conductors of such cables to a terminal for convenient connection to an aerial or bridle wire which extends over the pole line or to adjacent buildings.

In such a terminal box it is desirable that the workman be given ready access to all of the terminals so that he may readily lead in the bridle wires, since it is usual to mount such terminal boxes on the top of a pole where his movements are limited. It is also essential to protect the terminals from rain or snow which may be driven in through the crevices and apertures of the box. It is the object of the present invention to fulfill these requirements in an improved manner with a box of minimum size, and with an economy of material.

Another object of the present invention is to provide a terminal box in which bridle wires may be brought into the interior of the box in large groups or bundles, and may there be distributed to the various terminals, so that when the box is opened these wires are readily and freely accessible.

Hitherto terminal boxes for electric cables have been provided with sides and these have interfered with the work of the line men. In the present invention I provide a movable cover carrying flanges for suitably protecting the interior of the box when closed, but which are automatically put out of the way when the cover is opened.

The drawings and description illustrate one form of my invention, but it is understood that the scope of my invention is not to be determined thereby, reference being had to the appended claim for that purpose.

Figure 1:
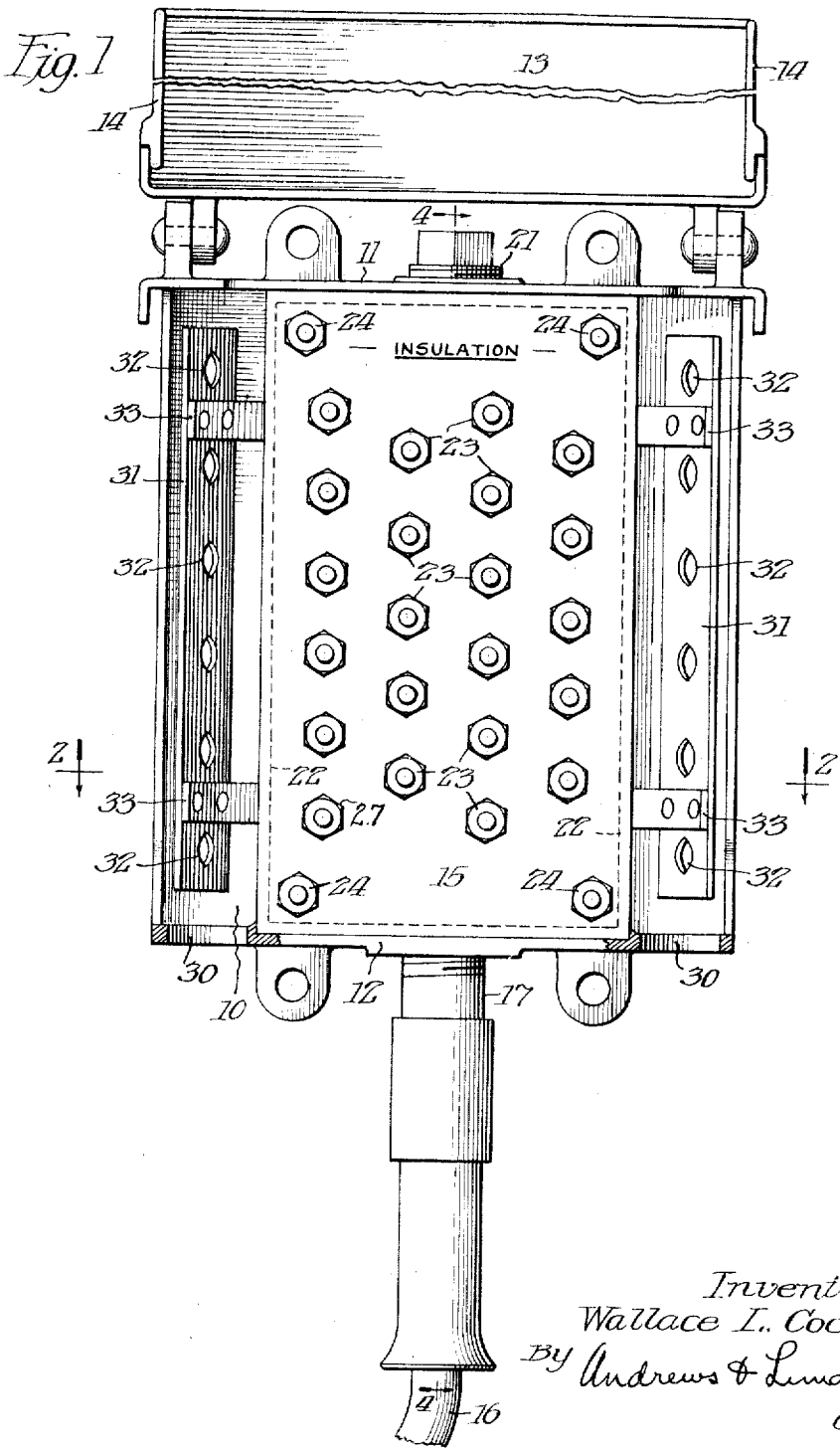
Figure 2:
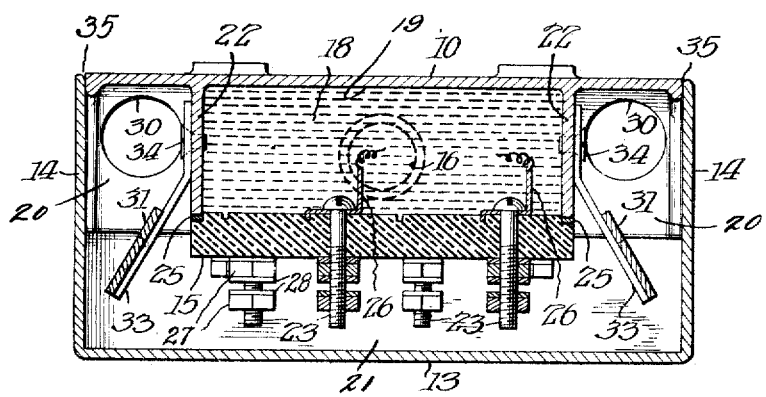
Figure 3:
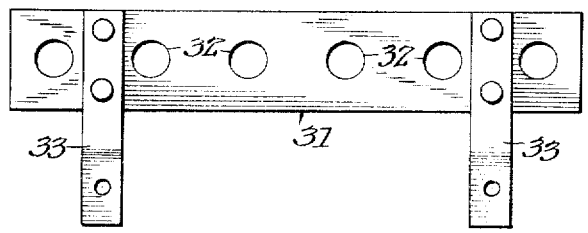
Figure 4:
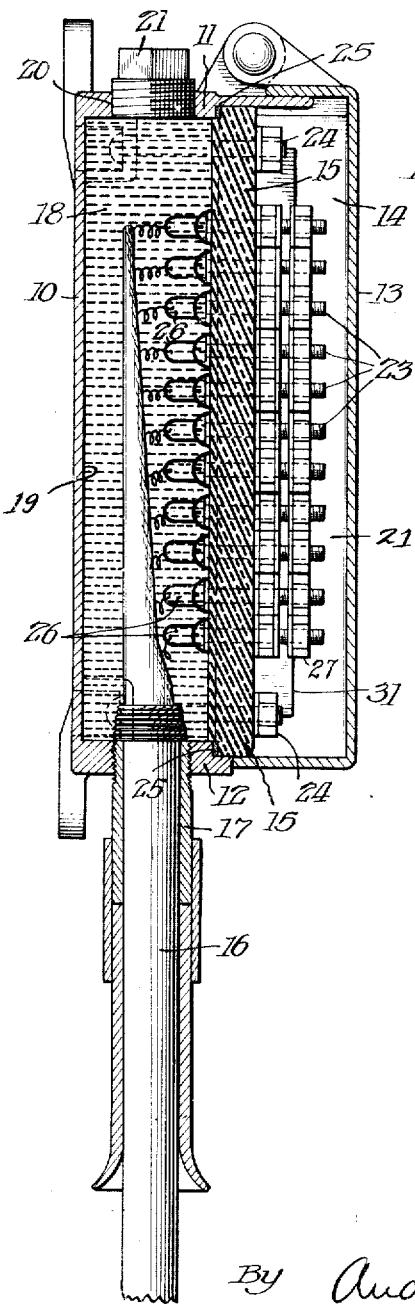

In the drawings, Fig. 1 represents a front view of the terminal box with the cover raised; Fig. 2 represents a horizontal cross section thereof with the cover closed, along the line 2—2 of Fig. 1. Fig. 3 shows a full side view of the fanning strip for supporting the bridle wires, and Fig. 4 shows a vertical cross section of the terminal box, along the line 4—4 of Fig. 1.

The terminal box of the present invention comprises a back board 10 with a top board 11, and a bottom board 12. The hinged cover 13 is provided with the side flanges 14, in U-shaped form, and is adapted when closed to completely enclose the interior of the box.

Extending frontwardly from the back board 10 are longitudinal ribs 22, and these, together with the top board 11, the bottom board 12, and mounting plate 15, form a casing 19 for terminating cable 16. The cable 16 is brought into the interior of this casing, and each wire thereof is connected to a terminal such as 23, a plurality of such terminals being mounted in the mounting plate 15. The cable end is drawn through the pipe 17, and through the opening in the bottom board 12, in the usual manner. The mounting plate 15 forms the front side of the casing, and is securely fastened by means of the mounting screws 24. The gasket 25 is provided between the mounting plate 15 and the longitudinal ribs 22, whereby said casing is effectively sealed. A compound 18 is poured into the casing through the aperture 20, and the aperture is then sealed by the blind plug 21. Thus the cable 16 is terminated in a completely enclosed and sealed casing, being thoroughly protected thereby from the weather.

A plurality of terminals 23 extend through the mounting plate 15. Each terminal 23 consists of a stud 26 securely fastened in said mounting plate to prevent turning, and is provided with nuts 27 and washers 28 whereby electrical conductors may be fastened to such terminals in the usual manner.

The top board 11 and the bottom board 12 are substantially as long as, or longer than, the back board 10 is wide, and in combination with the longitudinal ribs 22 form three compartments. The middle one of these compartments comprises the sealed casing for the terminal of the electric cable 16. The outermost compartments 20 are formed by such parts of the back board 10, the top board 11 and the bottom board 12, as extend beyond the casing, and the surfaces of the ribs 22. A fourth compartment 21 is formed by the cover 13 and the plate 15. Piercing the bottom board 12, below the two outermost compartments, are apertures 30, and these apertures provide a simple means of draining the box of moisture which may be driven through the crevices 35 by storm, as well as readily accessible means for leading the bridle wires into the terminal box. Such bridle wires are, of course, led in by the workman when the cover 13 is in its raised position, as shown in Fig. 1, and they may be brought into the compartment above the apertures 30 in a single bundle, and separated from such bundle within the box. While the cover is raised it will be seen that each compartment for these wires has only two side faces: one formed by the back board 10, and the other by longitudinal rib 22, so that the workman can arrange his wires with great freedom of movement.

The fanning strip 31 is mounted on the brackets 33 which are securely fastened by means of the screw 34 to the longitudinal rib 22. As shown in detail in Fig. 3 each fanning strip is provided with a plurality of perforations 32 through which the electrical conductors may be led into the compartments 21, and thus the fanning strip 31 provides means of supporting such conductors and relieving stresses and strains thereon. The conductors are then fastened to the terminals 23 by means of the usual nuts 27 and washers 28.

A terminal box is thus provided with a minimum amount of material being required therefor, with improved accessibility and convenience to the workman when at the top of a pole. The box is also very compact, having the three cable compartments 19, 20, 20, side by side in the same plane, and the fourth compartment 21, covering all of the other three compartments, so as to very conveniently connect the individual wires of the cables.

I claim as my invention:

An electric cable terminal box, the outer sides of said box forming a rectangular parallelopiped, comprising a central compartment and a compartment on each side thereof, all of said compartments having their rear sides lying in the same plane, and a fourth compartment extending across all of said three compartments, the entire front of said two side compartments opening into said fourth compartment, means in said fourth compartment for connecting the wires of said central compartment with the wires of said side compartment; said box having a cover hinged to the top end of the box, the outer sides of said compartments and substantially one-half of each end of said box being formed by said cover.

In testimony whereof, I hereunto set my hand.

WALLACE L. COOK.